Aug. 27, 1946.                    C. H. MORRIS                    2,406,703
                        TURBINE BLADE LOCKING APPARATUS
                              Filed June 8, 1944

Inventor
Cecil H. Morris
by K. S. Wyman
Attorney

UNITED STATES PATENT OFFICE 2,406,703

TURBINE BLADE LOCKING APPARATUS

Cecil H. Morris, Milwaukee, Wis., assignor to Allis-Chalmers Manufacturing Company, Milwaukee, Wis., a corporation of Delaware Application June 8, 1944, Serial No. 539,315

10 Claims. (Cl. 253—77)

This invention relates to packing means insertable in the local enlargement of a groove or the like provided in a support for retainably engaging the root portions of blades or other members to be mounted in row forming relation on such support and has for its object the provision of an improved packing means eliminating the use of a lock-screw or other special device for securing the packing elements in place while affording all of the advantages inherent in the type of packing disclosed and claimed in R. C. Allen's copending application S. N. 536,464, filed May 20, 1944, which issued on January 22, 1946 as Patent Number 2,393,447.

The construction and application of packing means embodying the invention will become readily apparent as the disclosure progresses and particularly points additional features considered of special importance and of general application although illustrated and described as applied to the mounting of turbine blades in a circumferentially extending blade root receiving and retaining groove.

Accordingly, the invention may be considered as consisting of the various details of construction, correlations of elements, and arrangements of parts as is more fully set forth in the appended claims and in the detailed description, reference being had to the accompanying drawing, in which:

Figures 2, 3:
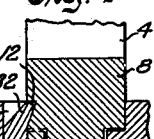
Fig. 2 is a section taken on line II—II of Fig. 1.
Fig 3 is a view similar to Fig. 2 with the packing pieces removed.

Referring to the drawing it is seen that the invention may be applied to a turbine rotor 1 embodying a circumferentially extending undercut groove 2 in which are disposed the root portions 3 blades 4; the root portions being of a shape complementary to the cross sectional configuration of the groove and the groove having a local enlargement 6 permitting the root portions of the blades to be inserted into the groove and then shifted laterally to the position shown in Fig. 3 whereupon they can be moved lengthwise of the groove in either direction from the enlarged portion thereof until the groove is substantially filled with blades as indicated. The root portion of each blade presents a pair of oppositely facing, radially extending plane surfaces 7 which abut the like surfaces on adjacent blades when the blades are in properly assembled relation (see Fig. 1); the thickness of the root portions, that is the distance between such plane surfaces, being sufficient to eliminate the use of spacing pieces between the root portions of adjacent blades. However, the cross-sectional configuration of the groove and whether or not spacing pieces are employed between the root portions of adjacent blades are features of design and may be varied as desired since the only requisite in this connection is that the groove and the root portions of the blades to be inserted therein be provided with suitable coacting retaining surfaces. Consequently, a further description in this connection is deemed unnecessary for a complete understanding of the present invention.

Figure 20:
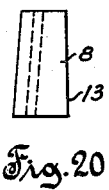
Fig. 20 is a top view of the element shown in Fig. 18.
Figures 15, 16:
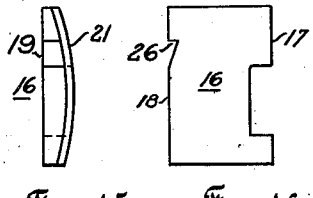
Fig. 15 is an edge view of the angularly displaceable element.
Fig. 16 is a side view of the element shown in Fig. 15.
Figures 13, 14:
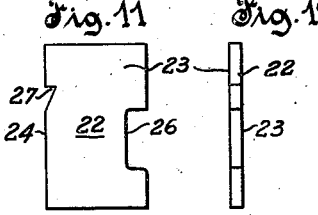
Fig. 13 is a side view of the filler piece.
Fig. 14 is right hand edge view of the element shown in Fig. 13.
Figure 18:
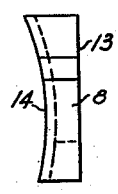
Fig. 18 is an edge view of the element shown as being driven toward its final position in Fig. 12.
Figure 19:
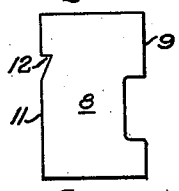
Fig. 19 is a side view of the element shown in Fig. 18.

The space remaining between the plane opposed surfaces presented by the spaced root portions of the blades adjacent opposite ends of the local enlargement 6 is filled with a plurality of packing pieces or elements (four being shown for purposes of illustration) comprising an element 8 (see Figs. 18-20 inclusive) having an edge 9 shaped to conform with the cross-sectional configuration of the right side of groove 2 and its opposite edge 11 substantially plain except for a recess 12 therein and having a plane, radially extending surface 13 complementary to the like surfaces presented by the root portions of the blades and an oppositely facing concave, cylindrical surface 14 extending in nonparallel wedge forming relation to its plane surface 13; an element 16 (see Figs. 15-17, inclusive) of less radial height than element 8 and having edges 17 and 18 similar to the edges 9 and 11, respectively, of element 8 except that the laterally projecting base portion of edge 17 is also of less radial height than the corresponding portion of edge 9, a plane radially extending surface 19 complementary to the like surfaces presented by the root portions of the blades, and an oppositely facing, convex cylindrical surface 21 extending in nonparallel, wedge forming relation to its plane surface 19; and a filler element 22 having oppositely facing plane parallel side surfaces 23 and 25 and edges 24 and 26 identical to the edges 9 and 11, respectively, of element 8.

Figure 4:
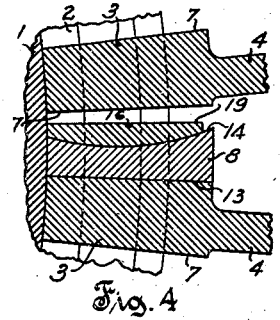
Fig. 4 is a section taken on line IV—IV of Fig. 1 showing only the first two packing pieces in place.
Figure 5:
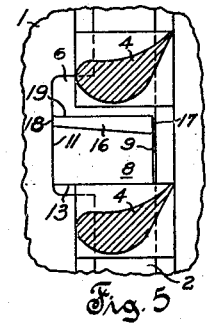
Fig. 5 is a plan view of the assembly shown in Fig. 4.
Figure 6:
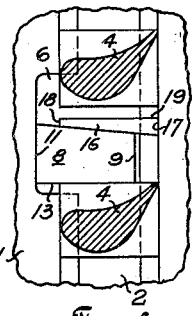
Fig. 6 is a view similar to Fig. 5 showing the angularly displaceable piece shifted to the right.
Figure 7:
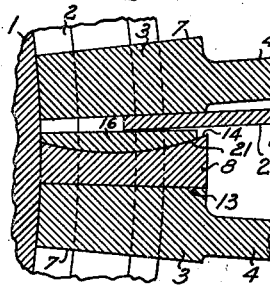
Fig. 7 is a view similar to Fig. 4 showing the relative position of parts when insertion of the filler piece is started.
Figure 8:
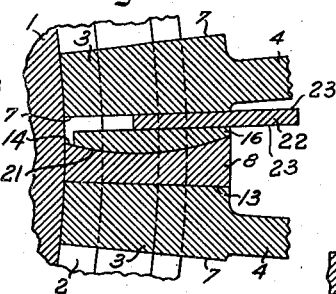
Fig. 8 is a view similar to Fig. 7 showing the final position of the angularly displaceable piece.
Figure 9:
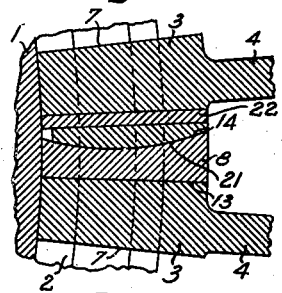
Fig. 9 is a view similar to Fig. 8 showing the relative position of parts with the filler piece in its lowermost position.
Figures 10, 17:
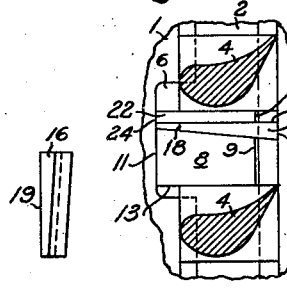
Fig. 10 is a plan view of the assembly shown in Fig. 9.
Fig. 17 is a top view of the element shown in Fig. 15.
Figures 11, 12:
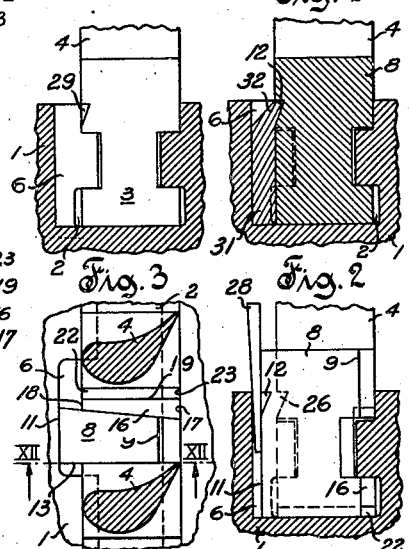
Fig. 11 is a view similar to Fig. 10 showing the filler piece in its final position.
Fig. 12 is a view taken on line XII—XII of Fig. 11 showing partial insertion of the wedge tool used in driving the projecting element to its final position.

The convex surface of element 16 is complementary to the concave surface 14 of element 8 and these two elements are adapted to be securely wedged between spaced opposed plane radially extending surfaces simply by positioning the elements between such surfaces in the abutting laterally offset relation indicated in Figs. 10 and 11 whereupon the desired wedging action can be obtained merely by driving element 8 towards the right as viewed in said figures. In this connection, the packing pieces are preferably assembled in the space remaining between the root portions of the blades by first positioning the elements 8 and 16 in such space as indicated in Figs. 4 and 5, then shifting element 16 laterally of the groove to the position shown in Fig. 6; then inserting filler element 22 to the extent indicated in Fig. 7 (in this position, elements 8 and 16 are both resting on the bottom of the groove and one side of the filler element abuts the opposite plane surface 7 of the adjacent blade root and its opposite side diverges relative to the opposed plane surface 19 of element 16), then angularly shifting element 16 relative to element 8 and relative to filler element 22 until its plane surface 19 is in parallel abutting engagement with the opposed surface of the filler element as indicated in Fig. 8 (the angular shifting of element 16 when loosely abutting element 8 is readily effected by an inward movement of element 22), then inserting the filler element to the extent indicated in Fig. 9 which retains element 16 in its angularly displaced relation relative to element 8 (the relative position of the elements 8, 16 and 22 being also shown in Fig. 10), and then shifting element 22 to the right to the extent indicated in Fig. 11 whereupon all that remains to be done in order to securely wedge the elements in place is to drive the element 8 to the right until its left hand edge 11 and the recess 12 therein alines with the similar recessed edges 18 and 24 of elements 16 and 22, respectively; the recesses in the edges 18 and 24 being designated 26 and 27, respectively.

Figure 1:
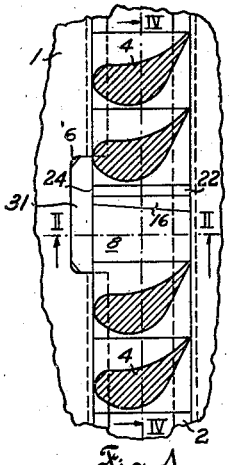
Fig. 1 is a developed plan view of a partial rotor structure embodying the invention.

The top portions of the elements project above the peripheral surface of the rotor as indicated in Figs. 2, 4, 7, 8, 9 and 11 and the driving of element 8 into wedging relation between element 16 and the plane surface 7 on the adjacent blade can be readily accomplished by first driving against the exposed edge 11 until such edge is spaced from the adjacent side wall of the groove enlargement 6 whereupon a wedge tool 28 can be inserted as indicated in Fig. 12 and driven downward toward the bottom of the groove thereby shifting element 8 to the right until its edge 11 is alined with the corresponding edges of the elements 16 and 22 and with the corresponding sides of the root portions of the blades immediately adjacent the opposite ends of the local enlargement 6. In this connection, the root portions of such blades may be provided with recesses 29 which are similar to and alined with the recesses in the corresponding edges of the elements 8, 16 and 22 when these elements are positioned as shown in Fig. 1. All that remains to complete the assembly is to insert a plane surfaced piece 31 in the enlargement 6 and bend over its upper reduced edge 32 into the groove formed by the alined recesses 12, 26, 27, and 29 provided in the corresponding edges of the elements 8, 16, 22 and blades 4, respectively, as clearly indicated in Fig. 2.

It should now be obvious that the edges 9, 17 and 23 of elements 8, 16 and 22 are interlockingly engaged with the right hand side wall of the grooves 2 as viewed in Figs. 2, 3 and 12 which prevents a vertical movement of such elements relative to each other and relative to the groove, that a movement of the elements toward the sidewall of the local enlargement opposing their edges 11, 18 and 24 is impossible with piece 31 in place, and that a vertical upward movement of piece 31 is impossible when its upper reduced edge 32 is disposed in the groove formed by the recesses in the opposed edges of the elements 8, 16 and 22 and the blades 4. In addition, it should also be noted that with the elements 8, 16 and 22 positioned as shown in Fig. 1, a vertical movement of element 16 relative to elements 8 and 22 is prevented by the abutting engagement of the complementary concave-convex cylindrical surfaces 14 and 21 irrespective of whether or not the right hand edge 17 of element 16 is actually interlockingly engaged with the opposed side wall of the groove 2. In this connection, it is preferable although not necessary that the complementary concave, convex cylindrical surfaces have a common axis lying in a horizontal plane normal to a vertical plane including or parallel to the plane surface of the element which is to be made cylindrically concave or convex as herein indicated and that the radius of curvature of such surfaces should not be so great as to render such surfaces incapable of functioning as disclosed.

Whether the right hand edge 17 of element 16 is actually interlockingly engaged with the opposed sidewall of the groove is dependent upon the angular displacement of element 16 relative to element 8 necessary in order to position its plane surface 19 in parallel relation to the opposed similar surface of element 22; such displacement of element 16 being permitted by having the projecting lower portion of its edge 17 of less height than the radial height of the undercut portion of the groove as is best indicated in Fig. 12. Obviously, the angular displacement of element 16 relative to element 8 varies the angle between its plane surface 19 and the plane surface 7 presented by the root portion of the opposed blade; the variation in such angle being sufficient to compensate for differences in the distance between the plane opposed surfaces 7 presented by the root portions of the blades immediately adjacent either end of the local enlargement 6 in groove 2 of as much or more than 0.2 of an inch. Stated differently, the extent to which element 16 can be angularly displaced relative to element 8 is sufficient to position its plane surface 19 in parallel relation to the similar opposed surface 7 on the root portion of the adjacent blade even though the distance between such surfaces may vary as much or more than 0.2 of an inch. Consequently, this construction permits the use of standard packing pieces for grooves of the same size and cross-sectional configuration, that is the elements 8, 16 and 31 may be made identical and interchangeably used in such grooves, and since the angle between the surface 19 of element 16 and the opposed surface 7 of the adjacent blade can be readily made constant by shifting element 16 relative to element 8, the only correction that has to be made for variations in the distances between such surfaces is to provide elements 22 of different thickness.

The driving of element 8 to its final wedging position (compare Figs. 11 and 1) circumferentially tightens the root portions of the blades on either side of the local enlargement to a much greater degree than has heretofore been possible with known constructions as the lack of space prevents driving caulking pieces or the like beneath or alongside the root portions of such blades. Moreover, the packing pieces are securely retained in wedged relation solely by their own coaction thereby eliminating the necessity of providing a locking screw or other special device for attaining this result. In addition, the disclosed construction permits ready assembly of the packing pieces within the space remaining to be filled by persons with only ordinary skill thereby materially reducing both the time element and the expense heretofore considered necessary in order to properly complete the assembly of such a blade row.

The invention is obviously applicable to the assembly of members other than blades in row forming relation on a suitable support and it should therefore be understood that it is not desired to limit the invention to the exact construction and correlations of features herein shown and described for purposes of illustration as various modifications within the scope of the appended claims may occur to persons skilled in the art.

It is claimed and desired to secure by Letters Patent:

1. In a mounting for a row of turbine blades or other members including a pair of adjacent members having root portions spaced apart and presenting plane opposed surfaces, a packing means comprising a pair of elements positioned between the root portions of said adjacent members for initial relative movement both angularly and linearly with respect to an axis extending crosswise of said row, said pair of elements having oppositely facing plane surfaces opposing the plane surfaces presented by said root portions and having abutting complementary concave, convex surfaces extending in non-parallel relation with respect to said oppositely facing surfaces and in concentric relation with respect to said axis.

2. In a structure embodying a support having a groove adapted for interlocking engagement with the root portions of members to be mounted thereon and a plurality of members having root portions interlockingly engaged with at least one wall portion of the groove with the root portions of a pair of adjacent members spaced apart and presenting plane opposed surfaces, a packing means comprising a pair of elements presenting oppositely facing plane surfaces and having complementary concave, convex cylindrical surface portions extending in nonparallel relation with respect to said oppositely facing surfaces and in concentric relation with respect to an axis extending crosswise of said groove, said pair of elements being positioned between the root portions of said adjacent members for initial relative movement both angularly and linearly with respect to said axis with said cylindrical surface portions effectively abuttingly engaged to permit said relative angular and linear movements of the elements.

3. In a structure embodying a support having a groove adapted for interlocking engagement with the root portions of members to be mounted thereon and a plurality of members having root portions interlockingly engaged with at least one wall portion of the groove with the root portions of a pair of adjacent members spaced apart and presenting plane opposed surfaces, a packing means comprising a pair of elements disposed in said groove between the plane surfaces presented by the root portions of said adjacent members for initial relative movement both crosswise and outwardly with respect to the groove, said pair of elements having oppositely facing plane surfaces with the plane surface of one element abuttingly engaging the plane surface of one root portion and with the plane surface of the other element disposed in opposed nonparallel relation with respect to the plane surface of the other root portion, said pair of elements also having complementary concave, convex surfaces extending crosswise of said groove in nonparallel relation with respect to said oppositely facing surfaces and effectively abuttingly engaged to position the plane surface of said other element in parallel relation with respect to the plane surface of said other root portion as said other element is moved outwardly of the groove relative to said one element and to increase the distance between said oppositely facing plane surfaces as said one element is moved crosswise of the groove relative to said other element, and means for retaining said other element positioned with its plane surface disposed in parallel relation with respect to the plane surface of said other root portion as said one element is moved crosswise of said groove.

4. In a mounting for a row of turbine blades or other members including a pair of adjacent members having root portions spaced apart and presenting plane opposed surfaces, a packing means comprising a pair of elements having oppositely facing plane surfaces and having complementary concave, convex cylindrical surface portions extending in nonparallel relation with respect to said oppositely facing surfaces and in concentric relation with respect to an axis extending transversely of said row, said elements being positioned between the root portions of said adjacent members for relative movement both angularly and linearly with respect to said axis with one of said oppositely facing surfaces disposed in parallel relation with respect to the plane surface of one of said root portions and with said complementary surfaces disposed in abutting engagement, said complementary surfaces being effective as said elements are moved relatively angularly to position the other one of said oppositely facing surfaces in parallel relation with respect to the plane surface of the other root portion, and a third element disposed in abutting relation between said other oppositely facing plane surface and said other root portion and presenting oppositely facing plane parallel surfaces of which one surface engages and retains said other oppositely facing plane surface in parallel relation with respect to the plane surface presented by said other root portion, said complementary surfaces being also effective as said elements are moved relatively linearly to forcibly urge the root portions of the members lengthwise of said row.

5. In a structure embodying a support provided with a groove having at least one wall portion thereof adapted for retainably engaging the root portions of members to be mounted on the support and having a local enlargement permitting the root portions of such members to be retainably inserted in the groove and a plurality of members having root portions retainably engaging said one wall portion with the enlarged portion of the groove at least partially free for the insertion of packing pieces between plane opposed surfaces presented by the root portions of a pair of adjacent members, a packing means for the space between said opposed surfaces comprising a pair of elements disposed in said groove between the root portions of said adjacent members for relative initial movement both crosswise and outwardly with respect to said groove, said pair of elements having oppositely facing plane surfaces opposing the plane surfaces presented by said root portions and having complementary concave, convex surfaces extending crosswise of said groove in non-parallel relation with respect to said oppositely facing surfaces and effectively abuttingly engaged to produce a wedging action lengthwise of said groove in response to a relative crosswise movement of the elements.

6. In a structure embodying a support provided with a groove having at least one wall portion thereof adapted for retainably engaging the root portions of members to be mounted on the support and having a local enlargement permitting the root portions of such members to be retainably inserted in the groove and a plurality of members having root portions retainably engaging said one wall portion with the enlarged portion of the groove at least partially free for the insertion of packing pieces between plane opposed surfaces presented by the root portions of a pair of adjacent members, a packing means comprising a pair of elements presenting oppositely facing plane surfaces and having complementary concave, convex surfaces extending in non-parallel relation with respect to said oppositely facing surfaces and in concentric relation with respect to an axis extending crosswise of said groove, said elements being positioned between the root portions of said adjacent members for relative movement both angularly and linearly with respect to said axis with one of said oppositely facing plane surfaces disposed in parallel relation with respect to the plane surface of the proximate one of said root portions and with said complementary surfaces disposed in abutting relation, said complementary surfaces being effective as said elements are moved relatively angularly to position the other of said oppositely facing surfaces in parallel relation with respect to the plane surface of said other root portion, a third element disposed between and presenting oppositely facing plane parallel surfaces abutting and retaining the opposed surfaces presented by said other element and root portion in the parallel relation attained by a relative angular movement of said elements, said complementary surfaces being also effective as said elements are moved relatively linearly to forcibly urge the root portions of said members lengthwise of the groove, said third and pair of elements being of equal width and presenting exposed plane edge portions forming a substantially continuous plane side surface opposing the side wall of the enlarged portion of said groove, and a plane surfaced fourth piece substantially filling the enlarged portion of said groove and abutting the plane side surface presented by the edge portions of said third and pair of elements.

7. In a structure embodying a support provided with a groove having at least one wall undercut to retainably receive projections on the root portions of members to be mounted on the support and having a local enlargement permitting the root portions of such members to be retainably inserted in the groove and a plurality of members having root portions retainably disposed in said groove with the enlarged portion of the groove at least partially free for the insertion of packing pieces between plane opposed surfaces presented by the root portions of a pair of adjacent members, a packing means comprising a pair of elements having oppositely facing plane surfaces and having abutting complementary concave, convex surfaces extending crosswise of said groove in nonparallel relation with respect to said oppositely facing surfaces, said pair of elements being positioned in said groove between the root portions of said adjacent members for relative linear movement crosswise of said groove with said complementary surfaces disposed in abutting engagement, said pair of elements also having edge projections adapted for interlocking engagement with said undercut wall with the edge projection of one element dimensioned to permit a limited outward movement of same relative to the other element to thereby position its plane surface in parallel relation with respect to the plane surface presented by the opposing root portion of the adjacent member.

8. In a structure embodying a support having a groove provided with an undercut side wall and with a local enlargement permitting insertion of the root portions of members to be mounted thereon and a plurality of members having root portions disposed within said groove and interlockingly engaged with said undercut side wall with the root portions of a pair of adjacent members spaced apart and presenting plane opposed surfaces disposed adjacent opposite ends of the local enlargement, a packing means comprising a pair of elements positioned between the root portions of said adjacent members and presenting oppositely facing plane surfaces opposing the plane surfaces presented by said root portions, said pair of elements also presenting edge projections adapted for interlocking engagement with said undercut side wall and having complementary concave, convex surfaces extending crosswise of said groove in nonparallel relation with respect to said oppositely facing plane surfaces and abuttingly engaged to permit relative movement of the elements crosswise of said groove and to render such relative movements effective to forcibly urge said elements lengthwise of the groove and to position said edge projections for interlocking engagement with said undercut side wall.

9. In a structure embodying a support having a groove provided with an undercut side wall and with a local enlargement permitting insertion of the root portions of members to be mounted thereon and a plurality of members having root portions disposed within said groove and interlockingly engaged with said undercut side wall with the root portions of a pair of adjacent members spaced apart and presenting plane opposed surfaces disposed adjacent opposite ends of the local enlargement, a packing means comprising a pair of elements positioned between the root portions of said adjacent members and presenting oppositely facing plane surfaces opposing the plane surfaces presented by said root portions, said pair of elements also presenting edge projections adapted for interlocking engagement with said undercut side wall and having complementary concave, convex surfaces extending crosswise of said groove in nonparallel relation with respect to said oppositely facing plane surfaces, one of said elements having its said edge projection dimensioned to permit said one element to move angularly relative to the other element when abutting same with its said edge projection disposed for interlocking engagement with said undercut side wall.

10. In a mounting for a row of turbine blades or other members including a pair of adjacent members having root portions spaced apart and presenting plane opposed surfaces, a packing means comprising a pair of elements positioned between the root portions of said adjacent members and having oppositely facing plane surfaces opposing the plane surfaces presented by said root portions, said pair of elements also having abutting complementary concave, convex surfaces extending crosswise of said row in non-parallel relation with respect to said oppositely facing surfaces and abuttingly engaged to permit relative cross-wise movement of the elements and to render such movements effective to forcibly urge said elements lengthwise of said row without changing the relative angularity of said oppositely facing plane surfaces.

CECIL H. MORRIS.